United States Patent [19]
Cook

[11] Patent Number: 5,326,117
[45] Date of Patent: Jul. 5, 1994

[54] HOSPITAL CART AND LID APPARATUS

[76] Inventor: Florence H. Cook, 64 West Union St., Goffstown, N.H. 03045

[21] Appl. No.: 27,423

[22] Filed: Mar. 8, 1993

[51] Int. Cl.5 .................................................. B62B 3/02
[52] U.S. Cl. .................................... 280/79.2; 280/651; 248/98; 248/129
[58] Field of Search ................. 280/639, 35, 651, 652, 280/654, 659, 47.17, 47.18, 47.24, 47.26, 47.34, 47.35, 79.2; 248/127, 128, 129, 95, 97, 98

[56] References Cited

U.S. PATENT DOCUMENTS

| | | | |
|---|---|---|---|
| 3,806,146 | 4/1974 | Shaw | 280/47.26 |
| 4,953,873 | 6/1986 | Nelson | 248/98 |
| 5,048,712 | 9/1991 | Wolters | 248/98 |
| 5,195,635 | 3/1993 | Cornwell | 280/47.34 |
| 5,209,517 | 5/1993 | Shagoury | 280/47.26 |
| 5,230,525 | 7/1993 | Delmerico et al. | 280/47.26 |

Primary Examiner—Richard M. Camby
Attorney, Agent, or Firm—E. Michael Combs

[57] ABSTRACT

A hospital cart structure is arranged to include a flexible support container suspended from the support frame structure of the cart, with the support container mounted within a rigid container loop, and the container loop having a lid member hingedly mounted to the loop in biased communication with the container hoop.

4 Claims, 4 Drawing Sheets

HOSPITAL CART AND LID APPARATUS

BACKGROUND OF THE INVENTION

1. Field of the Invention

The field of invention relates to container structure, and more particularly pertains to a new and improved hospital cart and lid apparatus arranged to maintain a lid closing relative to a suspended container.

2. Description of the Prior Art

Various refuse containers are utilized throughout the prior art as exemplified in the U.S. Pat. Nos. 4,450,976; 4,558,779; 4,342,402and 4,923,202.

The instant invention attempts to overcome deficiencies of the prior art by providing for a cart structure arranged in cooperation with a suspended container to include a lid arranged in communication with the container opening to prevent inadvertent access to the container and in this respect, the present invention substantially fulfills this need.

SUMMARY OF THE INVENTION

In view of the foregoing disadvantages inherent in the known types of refuse container and lid structure now present in the prior art, the present invention provides a hospital cart and lid apparatus wherein the same is arranged to maintain a hospital cart refuse container in a substantially sealed relationship by employing a spring-biased lid structure. As such, the general purpose of the present invention, which will be described subsequently in greater detail, is to provide a new and improved hospital cart and lid apparatus which has all the advantages of the prior art refuse container and lid apparatus and none of the disadvantages.

To attain this, the present invention provides a hospital cart structure arranged to include a flexible support container from the support frame structure of the cart, with the support container mounted within a rigid container loop, and the container loop having a lid member hingedly mounted to the loop in biased communication with the container hoop.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hospital cart and lid apparatus which has all the advantages of the prior art refuse container and lid structure and none of the disadvantages.

It is another object of the present invention to provide a new and improved hospital cart and lid apparatus which may be easily and efficiently manufactured and marketed.

It is a further object of the present invention to provide a new and improved hospital cart and lid apparatus which is of a durable and reliable construction.

An even further object of the present invention is to provide a new and improved hospital cart and lid apparatus which is susceptible of a low cost of manufacture with regard to both materials and labor, and which accordingly is then susceptible of low prices of sale to the consuming public, thereby making such hospital cart and lid apparatus economically available to the buying public.

Still yet another object of the present invention is to provide a new and improved hospital cart and lid apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
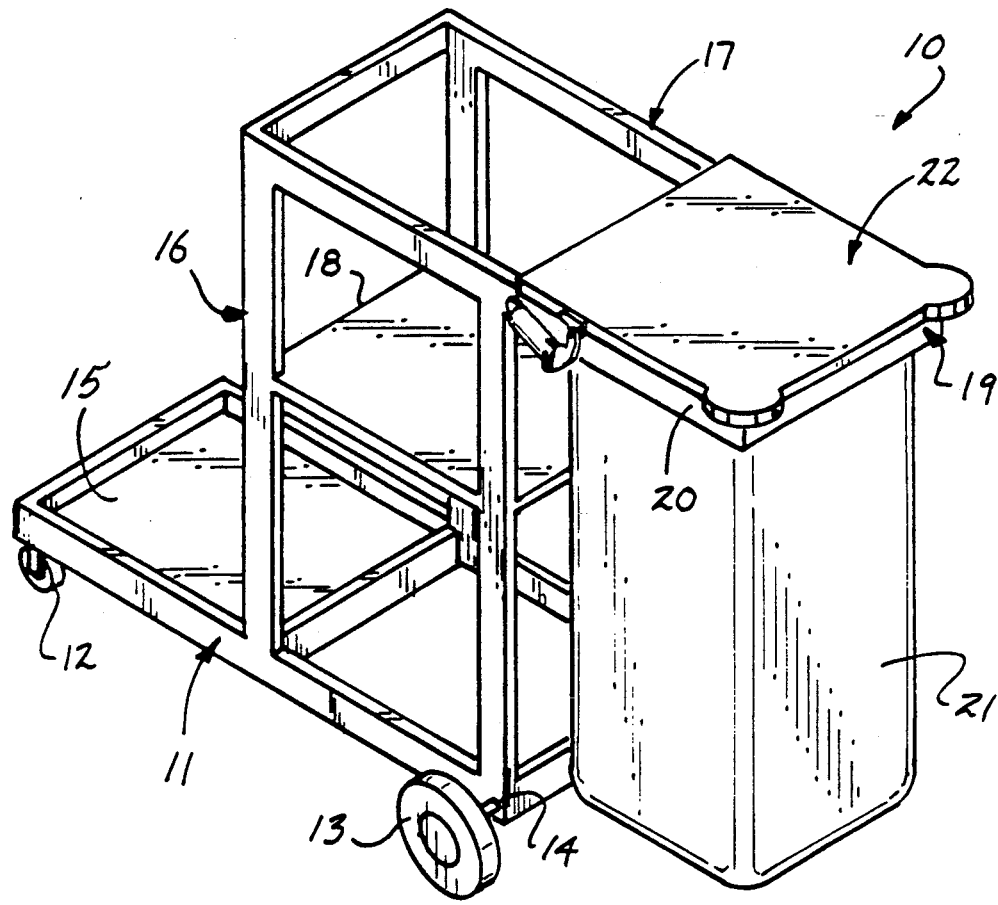
FIG. 1 is an isometric illustration of the invention.
Figure 2:
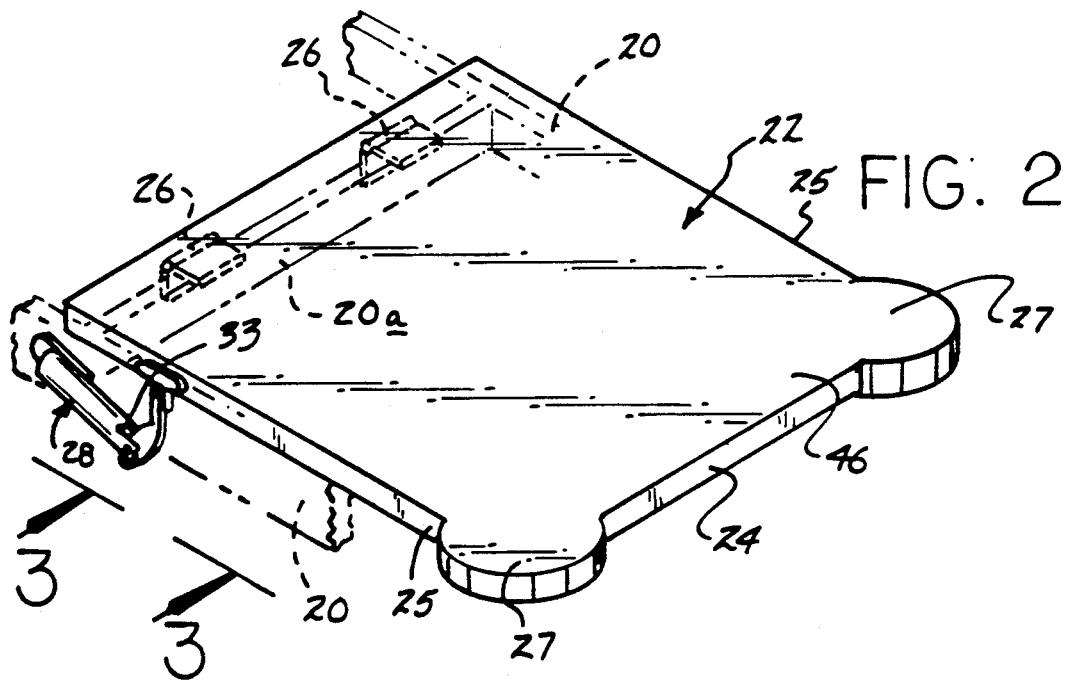
FIG. 2 is an isometric illustration of the lid structure of the invention.

With reference now to the drawings, and in particular to FIGS. 1 to 8 thereof, a new and improved hospital cart and lid apparatus embodying the principles and concepts of the present invention and generally designated by the reference numeral 10 will be described.

More specifically, the hospital cart and lid apparatus 10 of the instant invention essentially comprises, with reference to FIG. 1, a first support frame 11 having a plurality of caster wheels 12 spaced from a support axle 14, having support wheels 13 positioned exteriorly of the first support frame for ease of mobility of the structure, with a support plate 15 mounted within the first support frame 11 for support of various accessory components. An intermediate frame 16 is provided orthogonally oriented between the first support frame 11 and a second support frame 17. The intermediate frame 16 is arranged to include an intermediate frame shelf plate 18 parallel to the support plate 15 and offset relative thereto. The second support frame 17 includes a basket hoop 19 extending beyond the intermediate frame 16 and the first support frame 11, having suspended therefrom a flexible support container 21. The basket hoop 19 further includes spaced hoop side walls 20. A hoop rear wall 20a extending orthogonally between the hoop side walls 20 is spaced from a hoop front wall, wherein the hoop rear wall 20a includes a plurality of rear wall hinges 26 pivotally mounting a rigid support container lid 22 to the hoop rear wall 20a and extending over the basket hoop 19. The container lid 22 includes a lid rear wall 23 spaced from a lid front wall 24 and lid side walls 25, as well as a lid bottom wall 45, and a lid top wall 46. Mounted to at least one, and preferably to each of the lid side walls 25, into and adjacent one of the hoop side walls 20 is a spring-biased return member 28 pivotally mounted between a hoop side wall 20 and an adjacent lid side wall 25. The spring-biased return member 28 maintains the lid in the contiguous relationship relative to the basket hoop 19, as indicated in FIG. 1 for example. It should be further noted that the lid includes lid extension ear plates 27 extending in a coplanar relationship relative to the lid 22 from each intersection of each lid side wall 25 and the lid front wall 24 for ease of grasping and manual manipulation of the support container lid 22.

Figure 3:
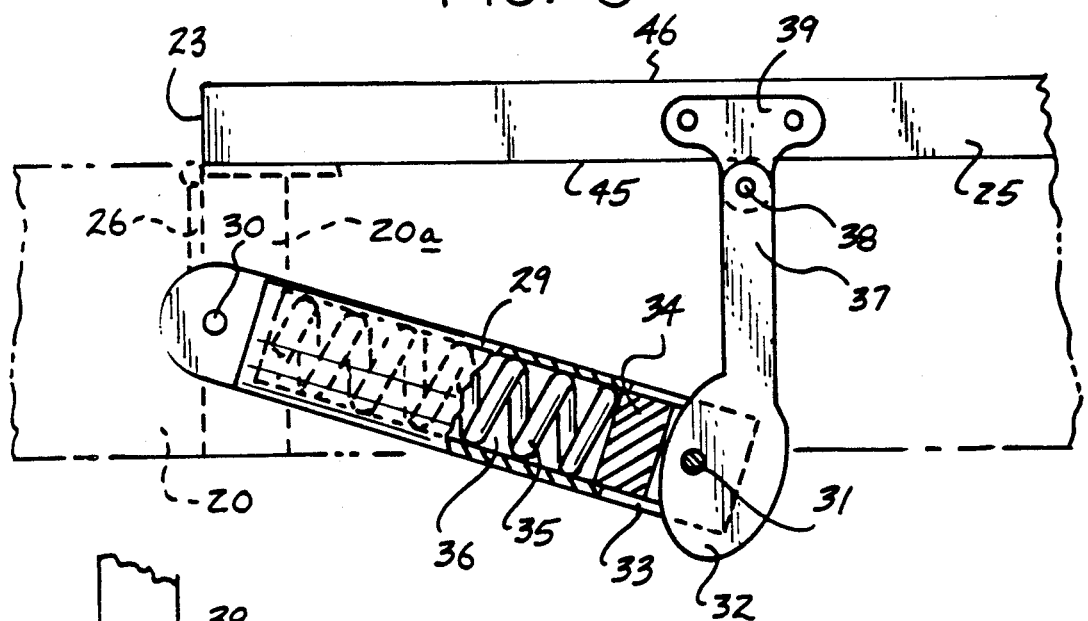
FIG. 3 is an orthographic view, taken along the lines 3—3 of FIG. 2 in the direction indicated by the arrows.
Figure 4:
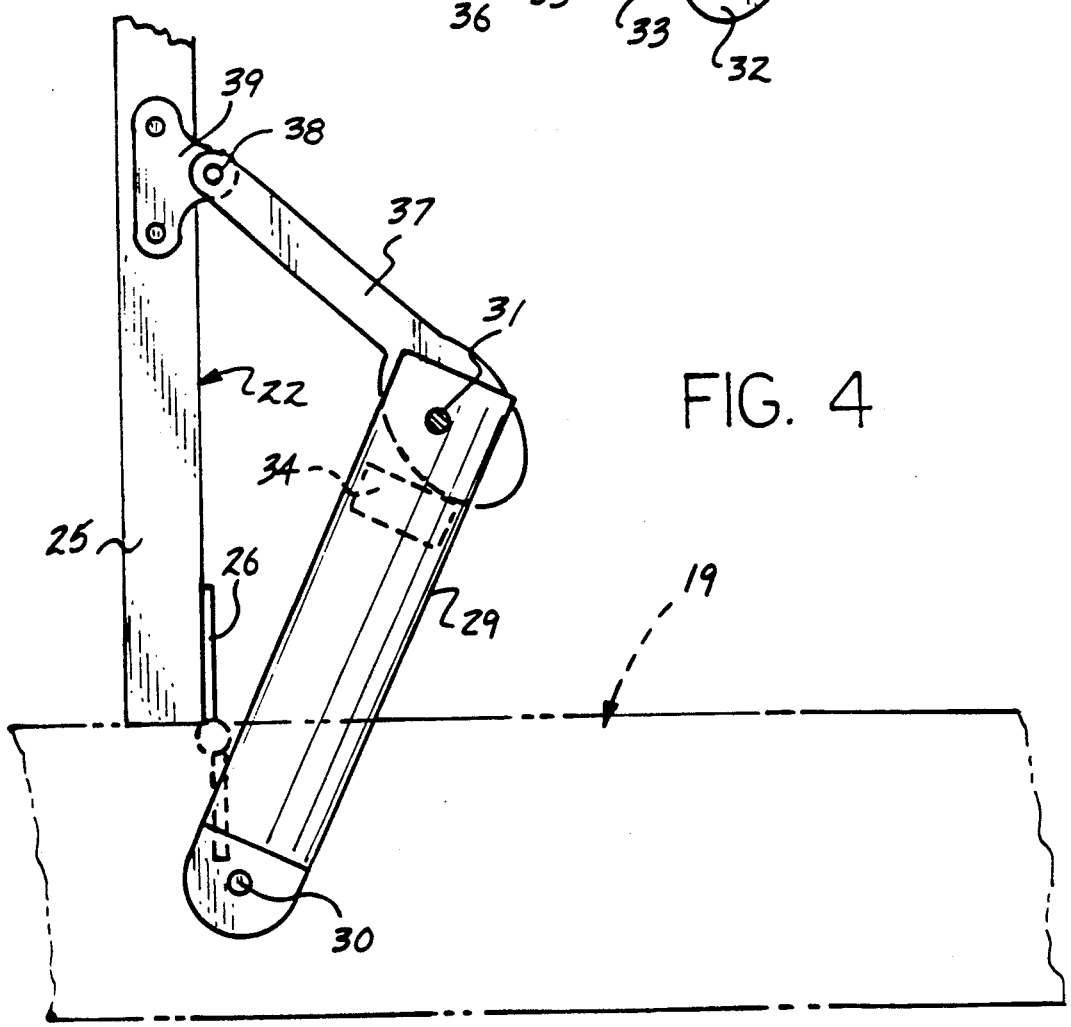
FIG. 4 is an orthographic view of the lid in a raised orientation relative to the support framework.
Figure 5:
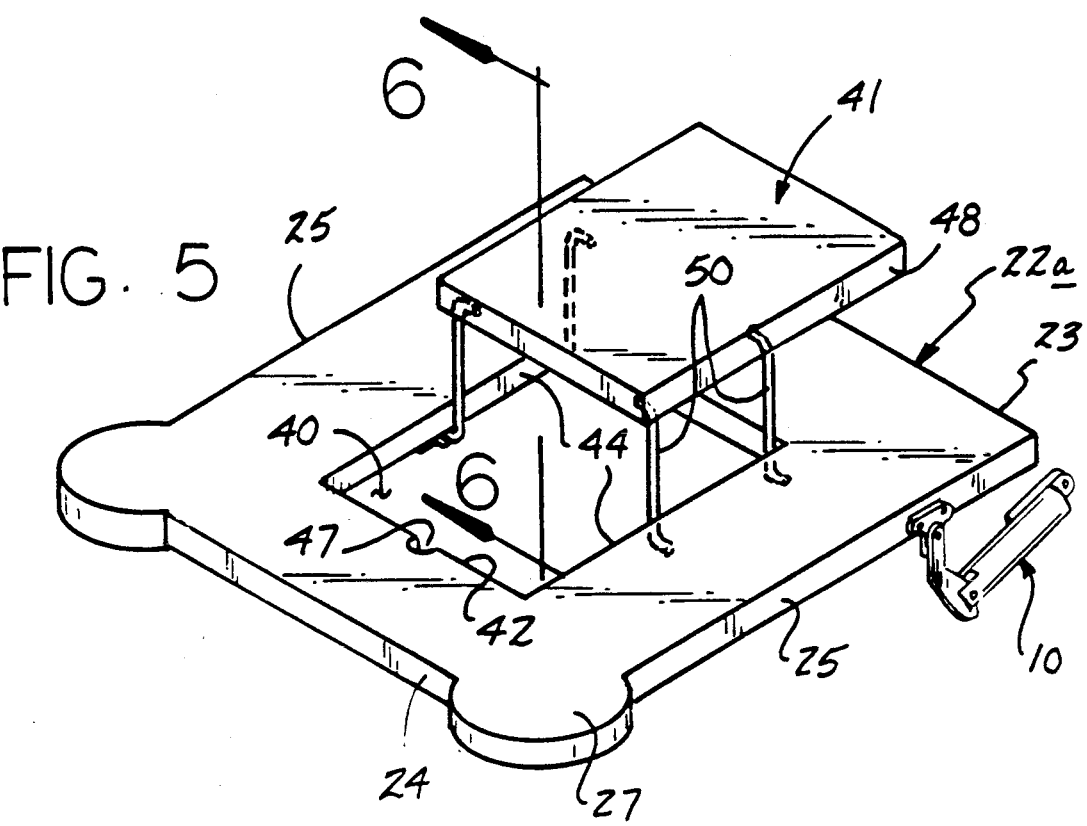
FIG. 5 is an isometric illustration of a modified lid structure.
Figure 6:
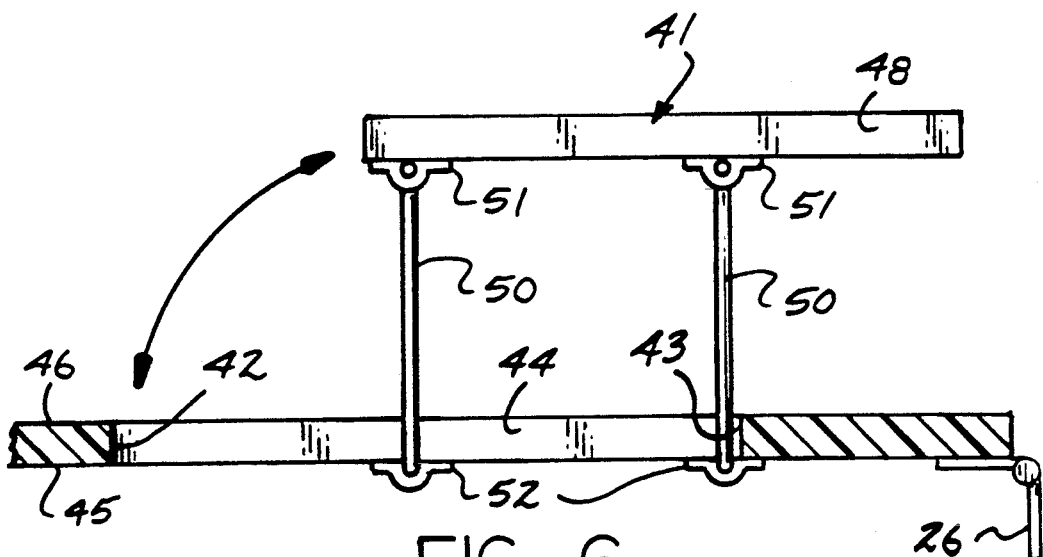
FIG. 6 is an orthographic view, taken along the lines 6—6 of FIG. 5 in the direction indicated by the arrows.

Each spring-biased return member 28 includes a spring tube 29 having a tube first end axle 30 pivotally mounted to the spring tube first end and to one of the hoop side walls 20 in adjacency to the hoop rear wall 20a. A tube second axle 31 is pivotally mounted adjacent the hoop second end directed through a tube second end slot 33. A cam lug 32 is eccentrically pivotally mounted to the spring tube second end axle 31 within the spring tube second end slot 33. A follower block 34 in contiguous communication with the cam lug 32 is positioned within the spring tube 29, with a spring 35 interposed between the follower block 34 within a spring cavity 36 within the spring tube 29 in biased contiguous communication with the follower block 34. A cam lug link 37 fixedly mounted to the cam lug 32 extends from the cam lug 32 terminating in a pivoted relationship relative to an axle support plate 39 about a link axle 38, with the axle support plate 39 mounted to the lid side wall 25, as indicated in the FIGS. 2–4. In this manner, the lid is biased in the contiguous first position, as indicated in FIG. 3, relative to the basket hoop 19 from the second displaced orientation or positioned as indicated in FIG. 4.

The FIGS. 5–8 indicates the use of a modified container lid 22a having a central opening 40, with a lid plate 41 arranged for displacement relative to the central opening, with the central opening 40 having an opening front wall 42 spaced from an opening rear wall 43 and spaced opening side walls 44. An access notch 47 is directed into the opening front wall 42 extending between the lid bottom wall 45 and the lid top wall 46. The lid plate 41 includes lid plate side walls 48, as well as a lid plate bottom wall 49, wherein a pivot link pair 50 are mounted to each of the lid plate side walls 48 and pivotally mounted to an underlying opening side wall 44. The individual pivot links of the pivot link pair 50 are of a generally "S" shaped configuration, with a first end of each pivot link pivotally mounted within a first pivot block 51 (see FIG. 6) mounted to the lid plate bottom wall, with the second end of each pivot link mounted to a second pivot block 52, that in turn is mounted to the container lid bottom wall 45. As the lid plate 41 is of a generally complementary configuration relative to the central opening 40, rotative displacement of the lid plate 41 within the central opening effects closure thereof permitting access within the support container 21 without lifting of the modified support container lid 22a.

Figure 7:
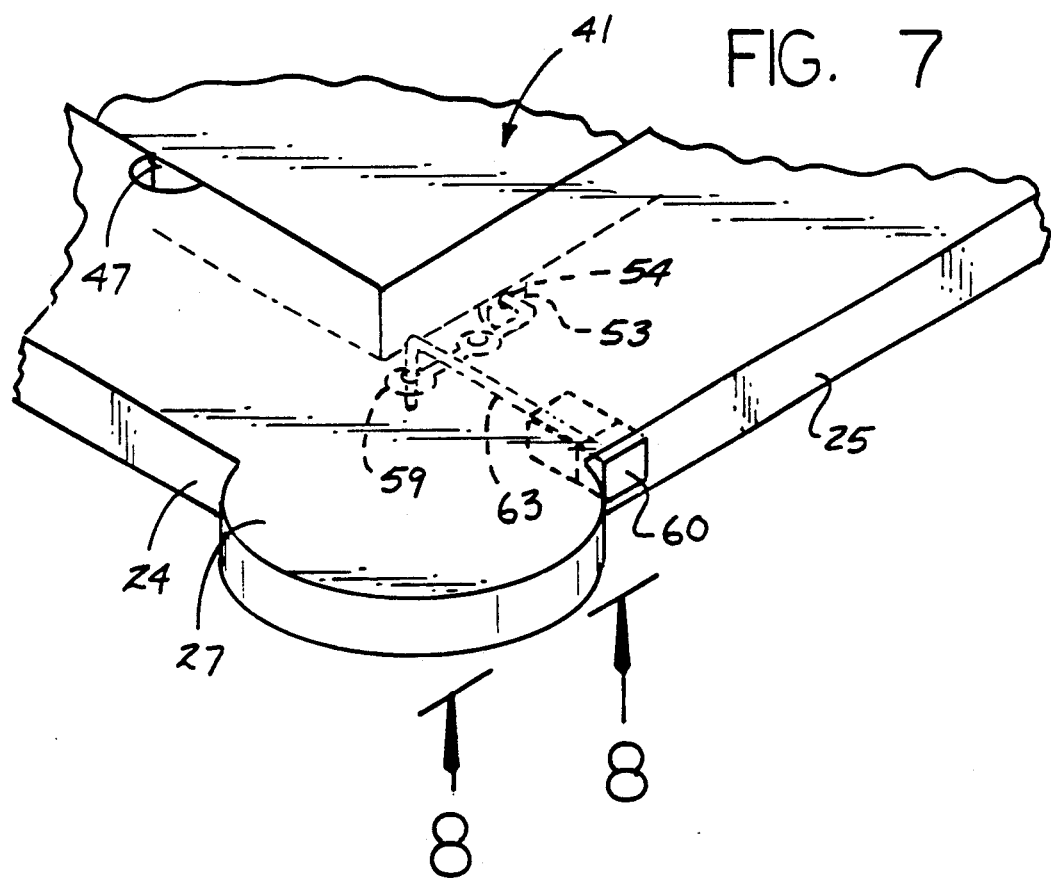
FIG. 7 is an isometric illustration of the modified lid structure employing a central lid plate.
Figure 8:
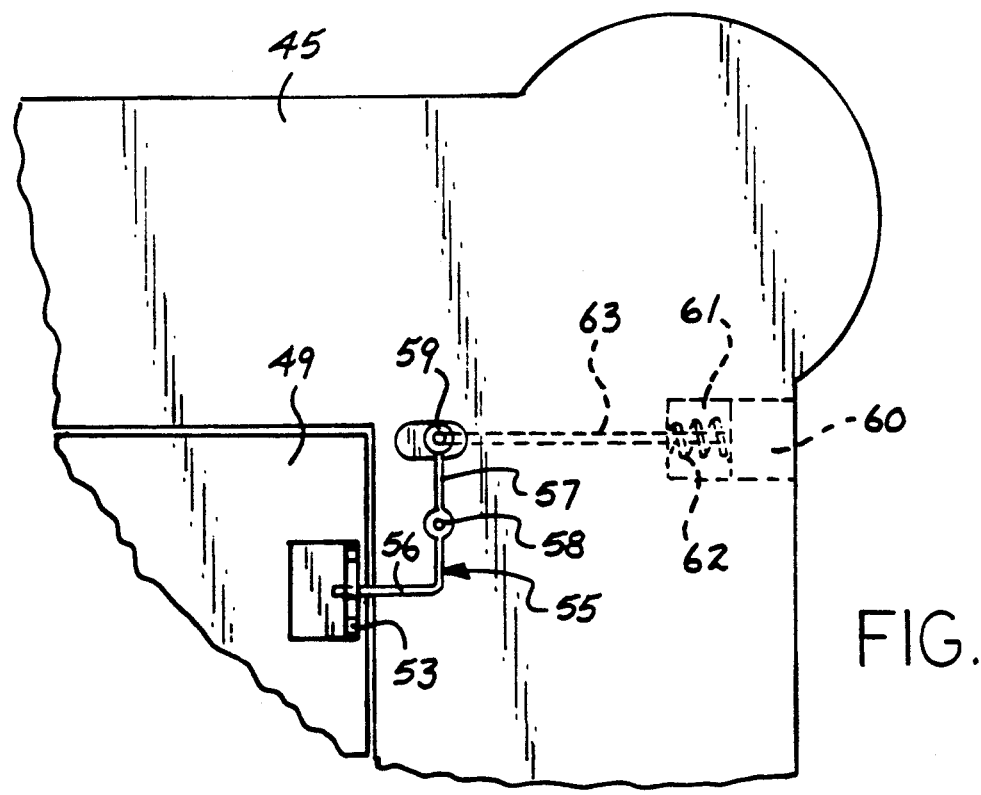
FIG. 8 is an orthographic view, taken along the lines 8—8 of FIG. 7 in the direction indicated by the arrows.

Additionally as indicated in the FIGS. 7 and 8, a latch structure relative to the lid plate 41 is provided that includes a latch plate 53 fixedly mounted to the lid plate bottom wall 49 and having a latch plate bore 54 arranged for sliding reception of a first leg 56 of a lock link 55. The lock link includes a second leg 57 fixedly mounted to the lock link first leg 56 at a first end of the second leg 57. A second leg axle 58 is directed orthogonally through the second leg and mounted to the container lid bottom wall 45. A second leg loop or pivot joint 59 is mounted to the second leg second end receiving a release button link 63 in a pivotal relationship, wherein a release button 60 is directed into one of the container lid side walls 25 within a release button cavity 61, with a release button spring interposed between the release button within a release button cavity floor of the cavity 61, wherein as the release button 60 is mounted to the release button link 63, longitudinal displacement of the release button link 63 rotates the second leg 57 providing for simultaneous displacement of the lock links first leg 56 from the latch plate bore 54 permitting access to displacement of the lid plate 41 relative to the lid plate central opening 40.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hospital cart and lid apparatus, comprising, a support frame means for support of a flexible support container, wherein the support frame means includes a rigid basket hoop, with the rigid basket hoop including hoop side walls, a hoop front wall, and a hoop rear wall, with the flexible support container directed through the basket hoop, and, a rigid support container lid having a lid rear wall spaced from a lid front wall, spaced lid side walls, a lid top wall, and a lid bottom wall, with each of the lid side walls positioned in a parallel adjacency relative to one of the hoop side walls, and, at least one rear wall hinge mounted to the hoop rear wall and to the support container lid to pivotally mount the support container lid over the basket hoop and arranged in communication with the basket hoop in a first position and spaced from the basket hoop in a second position, and, at least one spring-biased return member mounted to one of the hoop side walls in adjacency to the hoop rear wall, with the biased spring return member further mounted to an adjacent one of the lid side walls to bias the support container lid in the first position, and the spring biased return means includes a spring tube having a spring tube first end and a spring tube second end, the spring tube first end including a first end axle mounted to said at least one of the hoop side walls in adjacency to the hoop rear wall, with the spring tube second end having a second end slot, and a spring tube second end axle orthogonally directed through the spring tube second end slot, and a cam lug eccentrically mounted to the spring tube second end axle, and a spring cavity mounted within the spring tube extending between the slot and the spring tube first end, with a spring positioned within the spring cavity, and a follower block mounted to the spring in adjacency to the spring tube second end slot for biased communication of the follower block to the cam lug, the cam lug having a cam lug link fixedly mounted to the cam lug, and the cam lug link including a cam lug link axle spaced from the cam lug, and an axle support plate fixedly mounted to the support container lid pivotally mounting the cam lug link axle.

2. An apparatus as set forth in claim 1 wherein the support container lid includes a lid central opening, and a lid plate complementarily received within the lid central opening, the lid plate including a lid bottom wall spaced from the top wall, and lid side walls, with the lid central opening having an opening front wall spaced from an opening rear wall, and opening side walls, with an access notch directed into the opening front wall extending between the support container lid bottom wall to the support container lid top wall, and link means pivotally mounting the lid plate to the lid central opening.

3. An apparatus as set forth in claim 2 wherein the link means includes a pivot link pair mounted to each of the lid side walls, and with each pivot link pair pivotally mounted to the support container lid bottom wall, with each pivot link pair including an individual pivot link, with each individual link of a generally "S" shaped configuration, and said each pivot link having a pivot link first end, with a first pivot block mounted to the lid plate bottom wall receiving the pivot link first end, and said each pivot link second end including a second pivot block pivotally mounting said each pivot link to each said second pivot block, and each said second pivot block mounted to the support container lid bottom wall.

4. An apparatus as set forth in claim 3 including latch means mounted to the support container lid and to the lid plate for selective latching of the lid plate within the lid central opening, the latch means further including a latch plate fixedly mounted to the lid plate bottom wall in adjacency to one of the lid plate side walls, with the latch plate having a latch plate bore extending substantially parallel relative to the lid plate bottom wall, and a lock link, the lock link including a lock link first end having a first leg, with the first leg slidably received through the latch plate bore, and a second leg, the second leg having a second leg first end fixedly and orthogonally mounted to the first leg, the second leg having a second leg second end, having a second leg pivot joint mounted to the second leg second end, with a second leg axle orthogonally directed pivotally through the second leg intermediate the second leg first end and the second leg second end, with the second axle fixedly and orthogonally mounted within the container lid bottom wall, and a release button cavity directed into one of the support container lid side walls, with the release button cavity having a release button spring contained therewithin, and a release button mounted within the release button cavity, with the release button spring captured within the release button cavity interposed upon the release button, with a release button link mounted to the release button directed slidably through the support container lid from the release button to the second leg pivot joint and displacement of the release button effects displacement of the first leg relative to the latch plate bore.

* * * * *